US010041718B2

(12) United States Patent
Kim (10) Patent No.: US 10,041,718 B2
(45) Date of Patent: Aug. 7, 2018

(54) METHOD FOR CONTROLLING A REFRIGERATOR AND NON-TRANSITORY COMPUTER USABLE MEDIUM HAVING COMPUTER-READABLE INSTRUCTIONS EMBODIED THEREIN FOR SAME

(71) Applicant: Dongbu Daewoo Electronics Corporation, Seoul (KR)

(72) Inventor: Jin Hwan Kim, Seoul (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 834 days.

(21) Appl. No.: 14/179,075

(22) Filed: Feb. 12, 2014

(65) Prior Publication Data

US 2015/0184917 A1    Jul. 2, 2015

(30) Foreign Application Priority Data

Dec. 26, 2013  (KR) .................. 10-2013-0163560

(51) Int. Cl.
| F25B 49/00 | (2006.01) |
| F25D 17/00 | (2006.01) |
| F25D 17/04 | (2006.01) |
| F25D 17/06 | (2006.01) |
| F25D 21/04 | (2006.01) |

(52) U.S. Cl.
CPC .......... *F25D 17/062* (2013.01); *F25D 21/04* (2013.01); *F25B 2600/0251* (2013.01); *F25B 2600/112* (2013.01); *F25D 2700/02* (2013.01)

(58) Field of Classification Search
CPC ........ F25B 2600/112; F25B 2600/0251; F25D 17/062; F25D 21/04; F25D 2700/02; F25D 17/065; F25D 17/067; F25D 11/02

USPC ..... 62/80, 89, 131, 151, 177, 178, 186, 407, 62/404, 441

See application file for complete search history.

(56) References Cited

U.S. PATENT DOCUMENTS

| 6,138,460 A | 10/2000 | Lee |
| 2003/0167787 A1* | 9/2003 | Ohashi .................. F25D 17/04 62/443 |
| 2003/0209019 A1* | 11/2003 | Lee ......................... F25D 29/00 62/131 |

(Continued)

FOREIGN PATENT DOCUMENTS

| KR | 10-2000-0018473 | 4/2000 |
| KR | 10-2000-0026522 A | 5/2000 |

(Continued)

OTHER PUBLICATIONS

Cheon, Woo Cheol; Refrigerator, for Indicating a Cleaning Time of a Cold Room and a Freezer, and Control Method; English Abstract of KR 10-2011-0137427; Dec. 23, 2011; http://kpa.kipris.or.kr.

(Continued)

*Primary Examiner* — Ned Landrum
*Assistant Examiner* — Daniel C Comings (57) ABSTRACT

A method for controlling a refrigerator may include sensing whether a door of a refrigerator compartment is open, determining whether a compressor of the refrigerator is being driven, continuing driving a fan of the refrigerator if the door is open and the compressor is being driven, and driving the fan until the compressor is driven if the door is open and the compressor is not being driven.

10 Claims, 6 Drawing Sheets

(56) References Cited

U.S. PATENT DOCUMENTS

2011/0036105 A1* 2/2011 Feng .................... F25D 21/006
62/80

FOREIGN PATENT DOCUMENTS

| KR | 10-2001-0019695 | 3/2001 |
| KR | 10-2004-0048768 A | 6/2004 |
| KR | 10-2011-0137427 A | 12/2011 |

OTHER PUBLICATIONS

Korean Office Action dated May 14, 2015 issued in corresponding Korean Patent Application No. 10-2013-0163560.
Chinese Office Action dated Jul. 4, 2016 issued in corresponding Chinese Patent Application No. 201410052595.5 and English translation thereof.
European Search Report dated May 9, 2016 issued in corresponding European Patent Application No. 14177223.6.

* cited by examiner

METHOD FOR CONTROLLING A REFRIGERATOR AND NON-TRANSITORY COMPUTER USABLE MEDIUM HAVING COMPUTER-READABLE INSTRUCTIONS EMBODIED THEREIN FOR SAME

CROSS-REFERENCE TO RELATED APPLICATIONS

This application is based on and claims priority from Korean Patent Application No. 10-2013-0163560, filed on Dec. 26, 2013, the disclosure of which is incorporated herein in its entirety by reference.

TECHNICAL FIELD

The present disclosure relates to a refrigerator control method.

BACKGROUND

A refrigerator is an apparatus for keeping foods stored in a refrigerator compartment and a freezer compartment fresh by using cooling cycles provided by a compressor, a condenser, a capillary tube (or an expansion valve) and an evaporator.

The evaporator generates cold air in a cooling chamber, and the cold air is supplied to the refrigerator and the freezer compartments through a refrigerator compartment supply duct and a freezer compartment supply duct. Meanwhile, a fan induces the cold air into the refrigerator compartment and the freezer compartment. The cold air that has cooled down the refrigerator compartment and the freezer compartment returns to the cooling chamber through a refrigerator compartment return duct and a freezer compartment return duct.

The fan may be driven while the refrigerant circulates during cooling cycles using a compressor. However, when the fan is not driven, the cold air in the cooling chamber may flow back into the refrigerator compartment return duct or the freezer compartment return duct. Accordingly, the moisture in the refrigerator compartment may become frozen in the refrigerator compartment return duct and block the duct.

Such problems frequently occur in a bottom mounted freezer (BMF) refrigerator, in which the freezer compartment is under the refrigerator compartment. Such problems may be more severe in a small BMF refrigerator, in which the fan is placed in the refrigerator compartment, rather than in the freezer compartment.

SUMMARY

The present disclosure has been made in effort to provide a method for controlling a refrigerator that is capable of preventing moisture in a refrigerator compartment from freezing in a refrigerator compartment return duct as cold air in a cooling chamber flows back into the refrigerator compartment return duct.

To this end, a method for controlling the refrigerator in accordance with one or more embodiments of the present invention provide may comprise sensing whether a door of a refrigerator compartment is open, determining whether a compressor of the refrigerator is being driven, continuing to drive a fan of the refrigerator if the door is open and the compressor is being driven, and starting to drive the fan until the compressor is being driven if the door is open and the compressor is not being driven.

A freezer compartment of the refrigerator may be under the refrigerator compartment.

The fan may be in the lower part of the refrigerator compartment.

A method for controlling the refrigerator in accordance with another embodiment may comprise determining whether defrosting an evaporator of the refrigerator has been completed, and driving a fan of the refrigerator until a compressor of the refrigerator is being driven if the defrosting has been completed and the compressor is not being driven As a result, the disclosed method(s) for controlling a refrigerator is capable of preventing moisture in the refrigerator compartment from freezing in the refrigerator compartment return duct as the cold air in the cooling chamber flows back into the refrigerator compartment return duct.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, one or more exemplary embodiments according to the present disclosure will be described in detail with reference to the accompanying drawings. Various configurations of the present disclosure, and operations and/or effects according to the configurations of the present disclosure, will be clearly understood by the detailed description below.

It should be noted that the drawings are schematically provided and not necessarily to scale. The relative dimensions and ratios of the parts illustrated in the drawings may be exaggerated or reduced in size for clarity and convenience, and the dimensions are only examples without limitation. In the following description, the same elements will be designated by the same reference numerals or letters, although the elements are illustrated in different drawings, and a detailed explanation of configurations well known in the art may be omitted so as to avoid unnecessarily obscuring the subject matter of the present disclosure.

Exemplary embodiments of the present disclosure illustrate ideal embodiments in more detail. Accordingly, the exemplary embodiments shown in the drawings are expected to be changed in various ways. Therefore, the exemplary embodiments are not limited to specific configurations in the drawings, and may be changed to have various shapes and/or arrangements by manufacturing.

The present disclosure also includes algorithms, computer program(s), computer-readable media and/or software, implementable and/or executable in a general purpose computer or refrigerator a or freezer equipped with a conventional digital signal processor, and configured to perform one or more of the methods and/or one or more operations of the hardware disclosed herein. Thus, a further aspect of the invention relates to algorithms and/or software that implement a method for controlling a refrigerator that is capable of preventing moisture in a refrigerator compartment from freezing in a refrigerator compartment return duct as cold air in a cooling chamber flows back into the refrigerator compartment return duct. For example, the computer program or computer-readable medium generally contains a set of instructions which, when executed by an appropriate processing device (e.g., a signal processing device, such as a microcontroller, microprocessor or DSP device), is configured to perform the above-described method(s), operation(s), and/or algorithm(s).

The computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code. The code is generally digital, and is generally configured for processing by a conventional digital data processor (e.g., a microprocessor, microcontroller, or logic circuit such as a programmable gate array, programmable logic circuit/device or application-specific integrated circuit [ASIC]).

Figure 1:
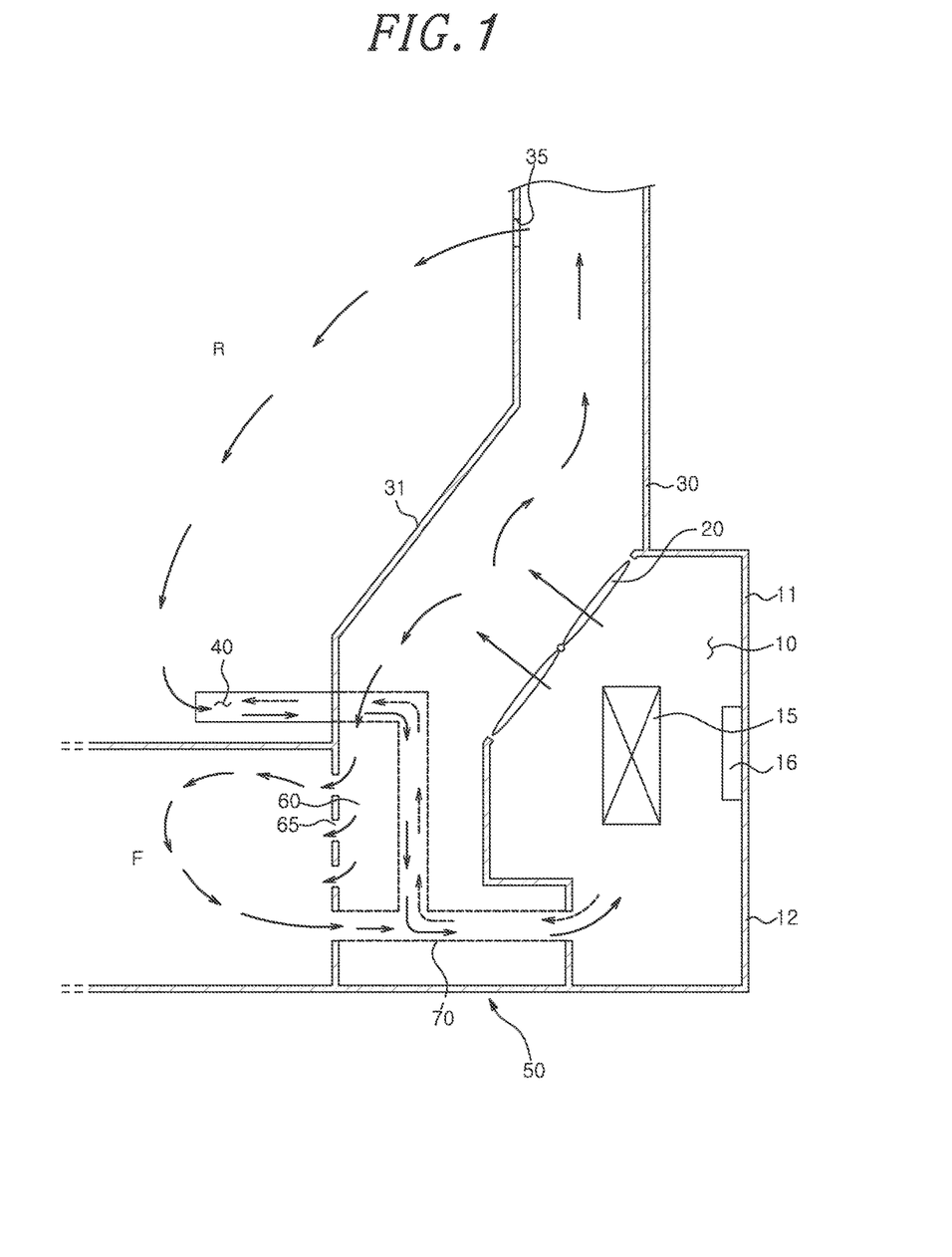
FIG. 1 is a view illustrating a cold air flow in an exemplary refrigerator and a backflow of the cold air into an exemplary refrigerator compartment return duct.

FIG. 1 is a view illustrating an air flow (represented by the solid arrow line) in a refrigerator and a backflow (represented by the dotted arrow line) of the cold air into an exemplary refrigerator compartment return duct 40.

The exemplary refrigerator illustrated in FIG. 1 is a bottom mounted freezer (BMF) refrigerator in which a freezer compartment F is placed under a refrigerator compartment R. Further, since the refrigerator illustrated in FIG. 1 may have a small size, a fan 20 may not be in the freezer compartment F due to size constraints. Accordingly, the fan 20 may be in the lower part of the refrigerator compartment R as illustrated in FIG. 1. A refrigerator compartment supply duct 30 may be on one side of the refrigerator compartment R (e.g., the right side of the refrigerator in FIG. 1, behind the compartment R), and the fan 20 may be in the refrigerator compartment supply duct 30. An upper case 11 may be on one side of the refrigerator compartment supply duct 30 (e.g., right side in FIG. 1) to form a cooling chamber 10. The refrigerator compartment return duct 40 may be in the lower part of the refrigerator compartment R.

A freezer compartment louver 50 may be on a side of the freezer compartment F (e.g., the right side in FIG. 1). A freezer compartment supply duct 60 and a freezer compartment return duct 70 may be in the freezer compartment louver 50. Further, the freezer compartment louver 50 may have a lower case 12 on one side (e.g., the right side of the freezer compartment louver in FIG. 1) to form the cooling chamber 10. The cooling chamber 10 may be formed by coupling the upper case 11 in the freezer compartment supply duct 30 and the lower case 12 in the freezer compartment louver 50. That is, the cooling chamber 10 may extend to, overlap, and/or communicate with both the refrigerator compartment R and the freezer compartment F. An evaporator 15 may be in the cooling chamber 10, and thus, cold air to cool the refrigerator compartment R and the freezer compartment F may be generated in the cooling chamber 10. Meanwhile, a heater 16 to defrost the evaporator 15 may be in the cooling chamber 10.

When cold air is generated in the cooling chamber 10, the cold air may flow into the refrigerator compartment supply duct 30, drawn by convection generated by the fan 20. The cold air flowing into the refrigerator compartment supply duct 30 may encounter a slope 31 in the refrigerator compartment supply duct 30. A part of the cold air may rise up the slope 31 into the refrigerator compartment R through a refrigerator compartment outlet 35, and the remaining cold air may descend down the slope 31. The remaining cold air descending down the slope 31 may flow into the freezer compartment F through the freezer compartment supply duct 60 and a freezer compartment outlet 65.

The rising part of the cold air and the remaining descending part of the cold air that cool the refrigerator compartment R and the freezer compartment F may return to the cooling chamber 10 through the refrigerator compartment return duct 40 and the freezer compartment return duct 70, respectively.

However, there may be a case where the fan 20 cannot be in the freezer compartment F, like the exemplary refrigerator illustrated in FIG. 1 (especially, a small type BMF refrigerator) due to the structure of the freezer compartment, but can be placed below and/or behind the lower part of the refrigerator compartment R. In this case, since the fan 20 is below and/or behind in the refrigerator compartment R and the cold air is distributed in the refrigerator compartment R, a low-pressure area may form in the space (e.g., in the refrigerator compartment R) where the fan 20 is if the fan 20 is not driven. Accordingly, the cold air of the cooling chamber 10 may flow back into the refrigerator compartment return duct 40, and moisture in the refrigerator compartment R may be frozen in or near the refrigerator compartment return duct 40, especially in or near an inlet of the refrigerator compartment return duct 40, which may result in blocking the refrigerator compartment return duct 40.

Figure 2:
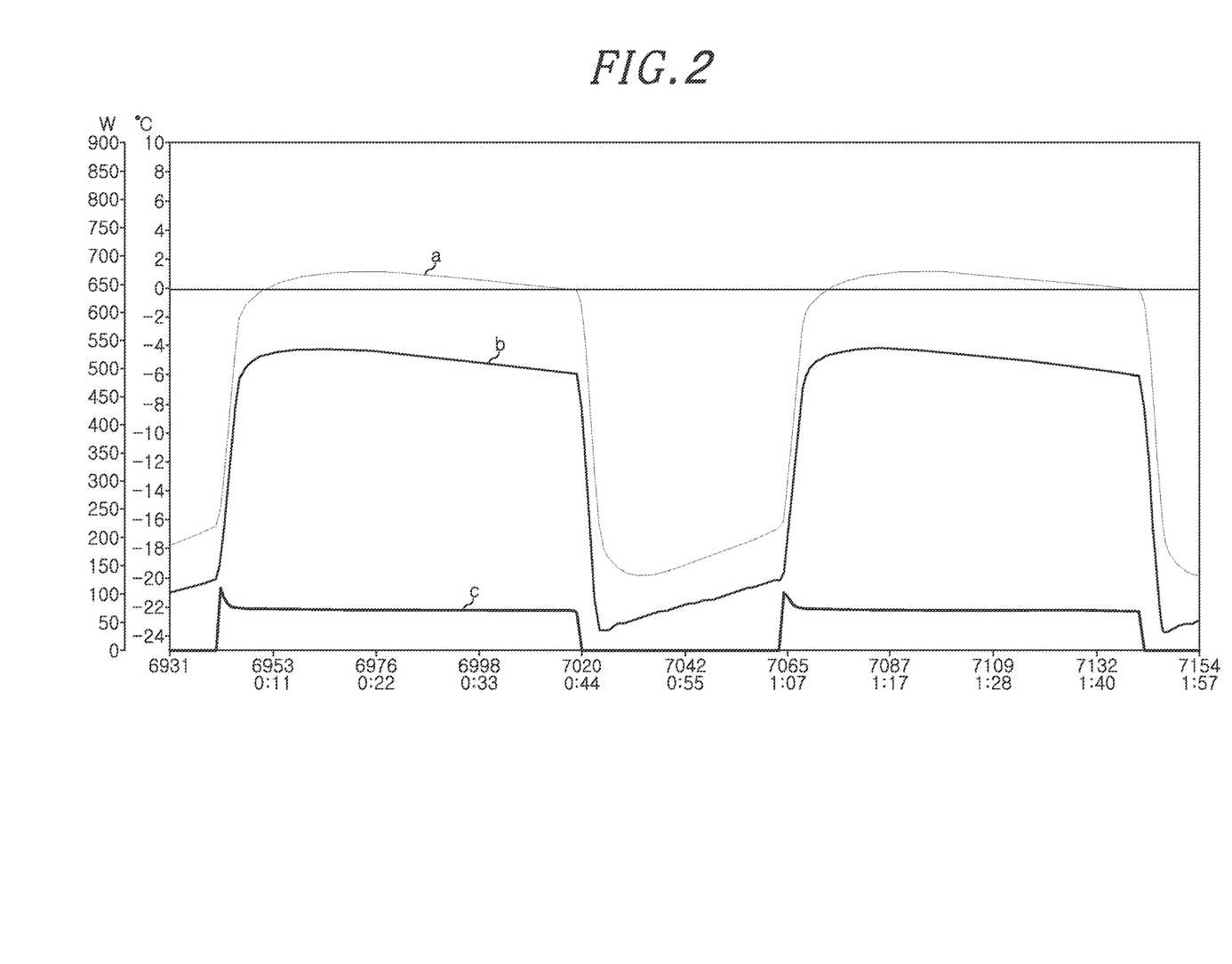
FIG. 2 is a view illustrating temperature variations of an exemplary refrigerator compartment return duct and an exemplary freezer compartment return duct based on compressor drive of the refrigerator of FIG. 1.

FIG. 2 is a view illustrating a temperature variation of the exemplary refrigerator compartment return duct 40 and the exemplary freezer compartment return duct 70 based on compressor drive of the refrigerator of FIG. 1.

Generally, the fan 20 is driven at the same time as a compressor. For example, when the compressor is driven, the fan 20 is driven, whereas when the compressor is not driven, neither is the fan 20. This is because the generated cold air is circulated (e.g., forcibly convected) using the fan 20 only when cold air is generated by the compressor.

In FIG. 2, the reference letters 'a' and 'b' illustrate temperature variations of the exemplary refrigerator compartment return duct 40 and the exemplary freezer compartment return duct 70 with time, respectively, and the reference letter 'c' in FIG. 2 illustrates the operation of the compressor with time. The horizontal axis indicates time (minutes), the inner vertical axis indicates temperature (Centigrade), and the outer vertical axis indicates power (Watts) used to drive the compressor.

Generally, when the compressor is driven, the fan 20 is also driven, and the temperature 'a' of the refrigerator compartment return duct 40 is above zero. Accordingly, when the compressor is driven, there is no backflow of the cold air, or the flow back of cold air, if any, is insufficient to result in freezing. However, the temperature of the refrigerator compartment return duct 40 may be below zero when neither the compressor nor the fan 20 are being driven. As a result, the moisture from the refrigerator compartment R meets the cold air that is flowing back into the refrigerator compartment return duct 40 and may freeze.

Figure 3:
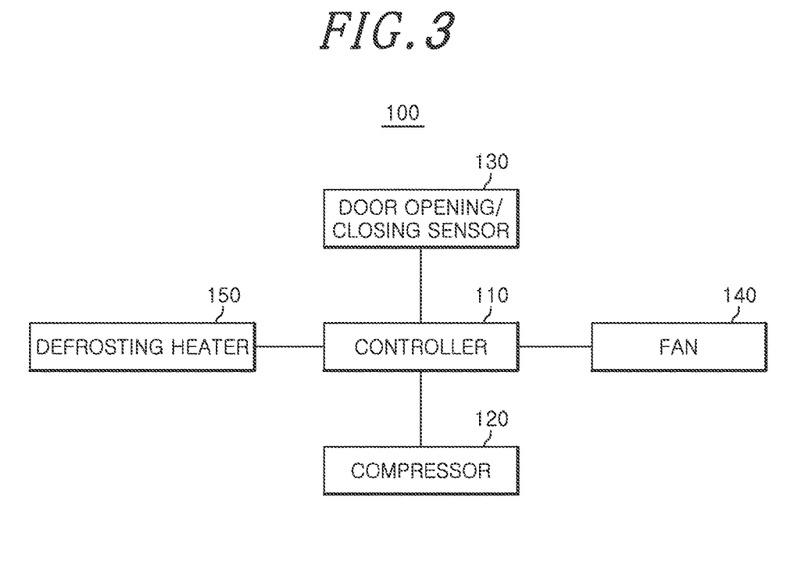
FIG. 3 is a block diagram illustrating an exemplary method for controlling a refrigerator according to embodiments of the present disclosure.

FIG. 3 is a diagram illustrating an exemplary embodiment for controlling a refrigerator. As illustrated therein, the configuration to control the refrigerator may include a controller 110, a compressor 120, a door sensor 130, a fan 140, and a defrosting heater 150. The configuration and/or system of FIG. 3 may further include a humidity sensor and/or a temperature sensor (not shown), which respectively provide humidity and temperature information to the controller 110.

To prevent freezing of the cold air due to backflow into the refrigerator compartment return duct 40, moisture in the refrigerator compartment should not enter the duct 40 while the fan 140 is not being driven. One important factor affecting the amount of moisture in the refrigerator compartment is the state of the refrigerator compartment door (e.g., open or closed). When the refrigerator compartment door is open, outside air flows into the refrigerator compartment, and the moisture in the outside air flows into the refrigerator compartment and may freeze.

Accordingly, the door sensor 130 may sense the state of the refrigerator compartment door (e.g., open or closed). When it is sensed that the refrigerator compartment door is open, the door sensor 130 sends the information to the controller 110, and the controller 110 takes actions to prevent freezing.

The compressor 120 is a component used in cooling cycles in the refrigerator. The compressor 120 may compress a refrigerant at a high temperature and at a high pressure, and supply it to a condenser. The refrigerant supplied to the condenser may pass through a capillary tube (or an expansion valve) and an evaporator, and may be used to cool the refrigerator compartment and the freezer compartment.

The fan 140 circulates and/or convects the cold air generated in the cooling chamber, causing it to flow into the refrigerator compartment supply duct 30, and then the refrigerator compartment and the freezer compartment. Meanwhile, according to some embodiments, the compressor 120 and the fan 140 may be driven simultaneously or separately.

The defrosting heater 150 may be used to heat and/or defrost the evaporator, as frost and/or ice may form on the surface of the evaporator as the refrigerator is operated. The defrosting heater 150 may generate thermal energy to be provided and/or applied to the evaporator, and the frost may be melted by the thermal energy. When the defrosting heater 150 is driven, the driving of the compressor 120 and the fan 140 may stop and/or be prevented from starting.

The controller 110 may keep the fan 140 driven when the refrigerator door is open and the compressor 120 is being driven to cool the refrigerator. When the compressor 120 is driven, the fan 140 may already be driven. However, when the refrigerator compartment door is open, the fan 140 is controlled to stop driving or operating. As described above, moisture may easily enter into the refrigerator compartment when the refrigerator compartment door is open. Accordingly, when the refrigerator door is open, the door sensor 130 may sense that the refrigerator compartment door is open and send the information to the controller 110. The controller 110 may keep the fan driven even when the refrigerator compartment door is open. Therefore, even when the moisture in the outside air flows into the refrigerator compartment due to the refrigerator compartment door opening, the cold air of the cooling chamber 10 does not flow back to the refrigerator compartment return duct since the fan 140 is constantly driving. Therefore, the probability that a freezing phenomenon will occur in the refrigerator compartment return duct may be reduced. As a result, the probability that ice and/or frost will block the refrigerator compartment return duct is also reduced.

Further, when the open refrigerator compartment door is sensed and the compressor 120 is not being driven, the controller 110 may drive the fan until the compressor 120 is driven. In a further embodiment, the controller 110 continues to drive or operate the fan 140 after the compressor 120 begins to operate (e.g., be driven).

For example, when the cooling levels of the refrigerator compartment and the freezer compartment satisfy a predetermined threshold (for example, a predetermined temperature), the compressor 120 may be in an idle state. At this time, since the compressor is not driven, the fan 140 is not driven. However, since moisture flows into the refrigerator compartment when the refrigerator compartment door is open, the refrigerator compartment return duct may become blocked by ice and/or frost. Therefore, the controller 110 may forcibly drive the fan 140 when the compressor 120 is not driven (e.g., when the door is open). By doing so, since the cold air of the cooling chamber may be prevented from entering the refrigerator compartment return duct by the fan 140, even when moisture flows into the refrigerator compartment, the probability that a freezing phenomenon occurs in the refrigerator compartment return duct may be reduced. In turn, the probability that the refrigerator compartment return duct will become blocked by ice and/or frost is reduced as well. As the compressor 120 is not driven for some length of time, the temperatures of the refrigerator compartment and the freezer compartment may rise, and thus the compressor 120 may be driven again. The fan 140 may also be driven as the compressor 120 is driven. Accordingly, the controller 110 may drive the fan 140 until the compressor 120 is driven again (and optionally thereafter as well). The controller 110 may be configured to automatically drive the fan 140 when the compressor 120 starts to drive.

In one embodiment, the controller determines when to run the fan from the number of times the door is opened, humidity information, and temperature information. The controller can calculate or estimate the amount of moisture in the air each time the door is opened from the humidity and temperature information, and add the total moisture and/or water vapor entering the refrigerator each time the door is opened and closed. Perhaps surprisingly, the total amount of moisture and/or water vapor entering the refrigerator does not increase significantly with the length of time that the door is open. As a result, a good estimate of the amount of moisture and/or water vapor entering the refrigerator can be made from humidity and temperature information each time the door is opened, and the length of time that the door is open can be disregarded. The controller then runs the fan when the door is open (and the compressor is off) after a predetermined threshold of total moisture and/or water vapor entering the refrigerator is reached. The controller can be reset appropriately (e.g., after the duct 40 is cleaned/defrosted).

Meanwhile, according to some embodiments, when the evaporator is defrosted, the compressor 120 may not be driven. In this case, the defrosting heater 150 may be driven so that the evaporator may be provided with the thermal energy. When defrosting the evaporator is completed (e.g., the frost and/or ice on the surface of the evaporator is completely melted), the compressor 120 may be driven. Further, when the cooling levels of the refrigerator compartment and the freezer compartment satisfy a predetermined threshold, the compressor 120 may not be driven again (e.g., stopped). It should be noted that the amount of moisture in the refrigerator compartment may naturally increase due to the melting of frost and/or ice, and such moisture may remain in the refrigerator compartment at least until the compressor 120 is driven (and then not driven again after the defrosting is completed). For example, when cooling levels of the refrigerator compartment and the freezer compartment satisfy the predetermined threshold, the compressor 120 may stop operating. When the compressor 120 is driven and then not driven again after the defrosting is completed, the controller 110 may drive (e.g., rotate) the fan 140 until the compressor 120 is driven again. Accordingly, the cold air in the cooling chamber does not flow back into the refrigerator compartment return duct, which may reduce the probability of moisture freezing in the refrigerator compartment return duct.

Figure 4:
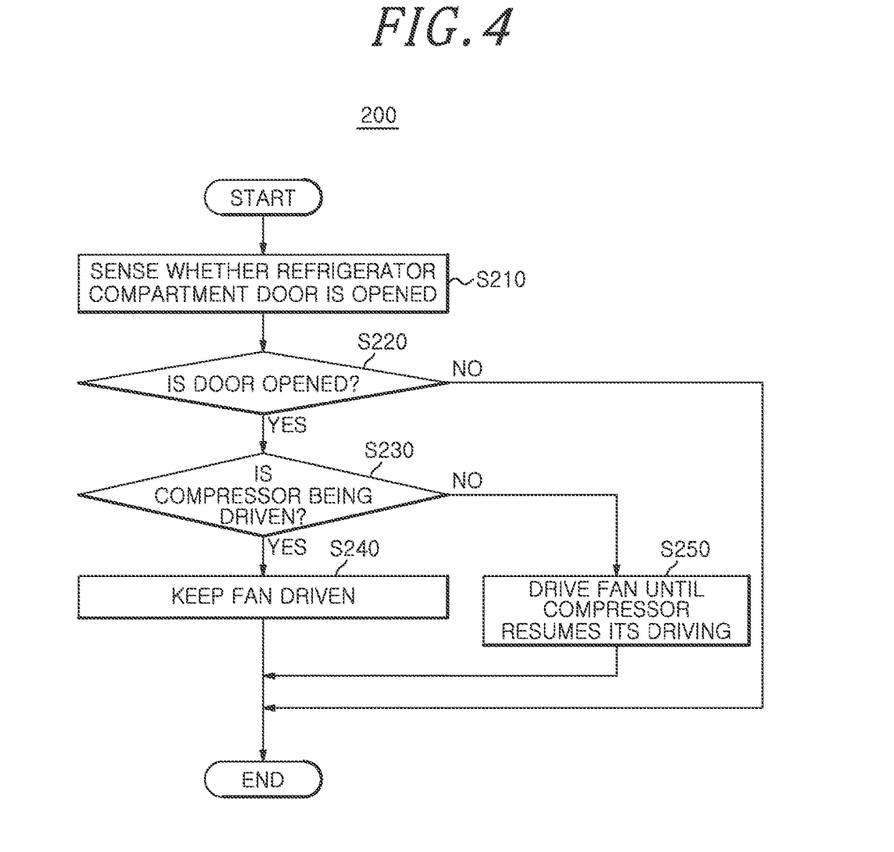
FIG. 4 is a flowchart illustrating an exemplary method for controlling a refrigerator according to embodiments of the present disclosure.

FIG. 4 is a flowchart illustrating a method for controlling a refrigerator 200 in accordance with an embodiment.

Opening the refrigerator compartment door is a main cause of moisture flowing into the refrigerator compartment. The door sensor 130 may sense when the refrigerator compartment door is open (S210) and notify the controller 110 (S220). If the door sensor 130 senses that the refrigerator compartment door is not open, it could indicate that moisture outside the refrigerator is not flowing into the refrigerator compartment. In this case, no special action is required. However, when it is sensed that the refrigerator compartment door is open, since the moisture outside the refrigerator may flow into the refrigerator compartment, the method determines whether the compressor 120 is being driven (S230). If the compressor 120 is being driven, the fan 140 must have already been driven, and the controller 110 continues driving the fan when the refrigerator compartment door is open (S240). If the compressor 120 is no longer driven, the fan 140 may be in a suspended or stopped state, and therefore the controller 110 may forcibly drive the fan 140 until the compressor 120 resumes operation to cool the refrigerator compartment and the freezer compartment (S250). Since moisture may flows into the refrigerator compartment R when the door is open, the fan 140 is driven so that the cold air in the cooling chamber does not flow back into the refrigerator compartment return duct, thereby preventing the refrigerator compartment return duct from being blocked with frozen moisture.

Figure 5:
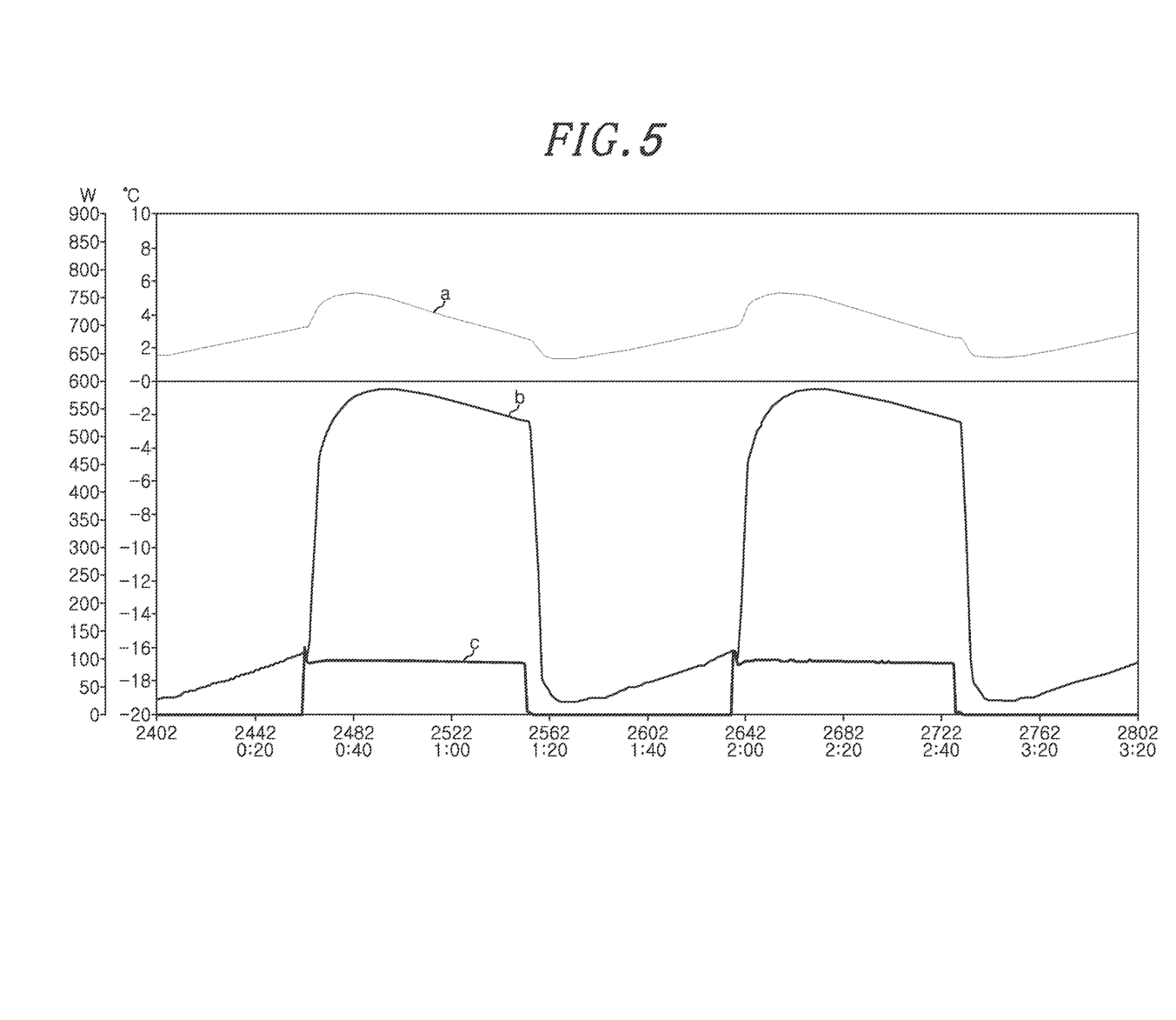
FIG. 5 is a view illustrating temperature variations of an exemplary refrigerator compartment return duct and an exemplary freezer compartment return duct based on compressor drive when controlling the refrigerator of FIG. 1 according to the exemplary method of controlling a refrigerator of FIG. 4.

FIG. 5 is a view illustrating temperature variations of an exemplary refrigerator compartment return duct and an exemplary freezer compartment return duct based on the driving of the compressor 120 when the refrigerator shown in FIG. 1 is operated in accordance with the refrigerator control method 200 illustrated in FIG. 4. The horizontal axis indicates time (minutes), the inner vertical axis indicates temperature (Centigrade), the outer vertical axis indicates power (Watts) used to drive the compressor.

Reference letters 'a' and 'b' in FIG. 5 indicate temperature variations of the refrigerator compartment return duct and the freezer compartment return duct as time passes, respectively, and a reference letter 'c' in FIG. 5 indicates the operation of the compressor as time passes. In comparison with FIG. 2, the overall temperatures of the refrigerator compartment return duct and the freezer compartment return duct are higher. With regard to temperature curve 'a', the refrigerator compartment return duct maintains its temperature above zero even when the compressor 120 is not driven, as well as when the compressor 120 is driven. Accordingly, even if moisture flows into the refrigerator compartment, the probability that the moisture will freeze may be very low. This is because the cold air in the cooling chamber is prevented from flowing back into the refrigerator compartment return duct by the driving of the fan 140, and/or because only a slight amount of the cold air, if any, flows back into the refrigerator compartment return duct. This may prevent the temperature of the refrigerator compartment return duct from dropping below zero.

Figure 6:
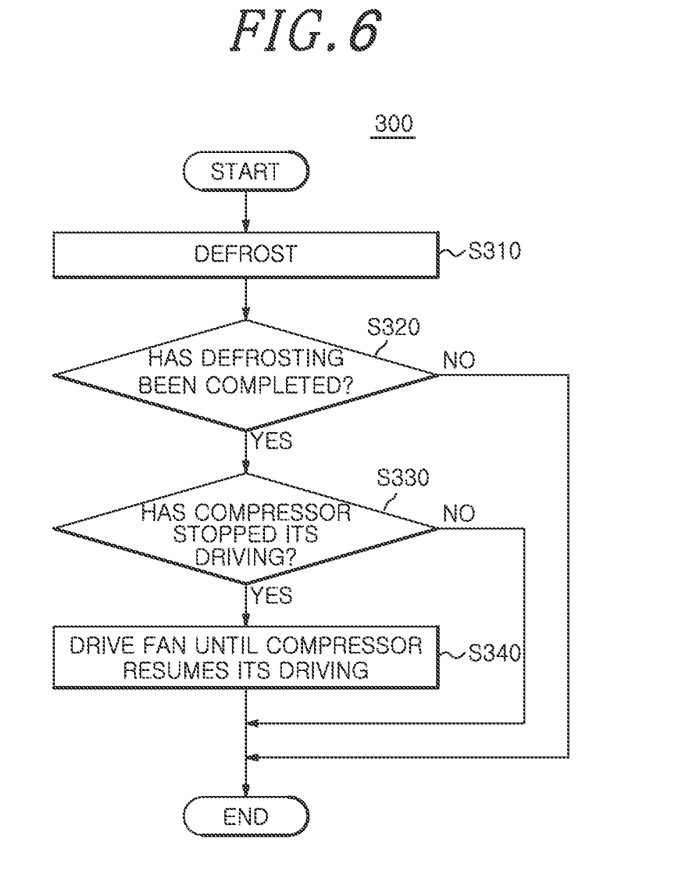
FIG. 6 is a flowchart illustrating a method for controlling a refrigerator according to an embodiment of the present disclosure.

FIG. 6 is a flowchart illustrating an exemplary method for controlling a refrigerator 300 in accordance with another embodiment of the present disclosure.

When the evaporator requires defrosting, the compressor 120 is not driven and the defrosting heater 150 defrosts the evaporator by generating thermal energy and/or applying thermal energy to an exterior of the evaporator (S310). When defrosting is complete (S320), since the frost and/or ice on the surface of the evaporator melts, the amount of the moisture in the refrigerator compartment may naturally increase. In such case, if the cold air in the cooling chamber flows back into the refrigerator compartment return duct, the refrigerator compartment return duct may become blocked with the moisture frozen by the cold air. As described above, when defrosting is complete, the compressor 120 may resume driving and/or operation, and the fan 140 may also resume driving and/or operation accordingly. However, the compressor 120 may not resume driving and/or operation when cooling levels (e.g., temperatures) of the refrigerator compartment and the freezer compartment satisfy the predetermined threshold(s) (S330). Since the moisture from the melted frost and/or ice may still exist in the refrigerator compartment, the controller 110 may drive, rotate and/or operate the fan 140 (S340). When the temperatures in the refrigerator compartment and the freezer compartment rise again, the compressor 120 may resume driving and/or operation in order to cool the refrigerator compartment and the freezer compartment, and the fan 140 may also resume driving and/or operation accordingly. Thus, the controller 110 may drive the fan 140 until the compressor 120 resumes its driving.

Although exemplary embodiments of the present disclosure are described above with reference to the accompanying drawings, those skilled in the art would understand that the present disclosure may be implemented in various ways without changing the necessary features or the spirit of the present disclosure.

Therefore, it should be understood that the exemplary embodiments described above are not limiting, but only an example in all respects. The scope of the present disclosure is expressed by claims described below, not the detailed description, and it should be construed that all of changes and modifications achieved from the meanings and scope of claims and equivalent concepts are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for controlling a refrigerator, the method comprising:
sensing whether a door of a refrigerator compartment is open;
determining whether a compressor of the refrigerator is being driven;
continuing driving a fan of the refrigerator so as to prevent cold air generated in a cooling chamber from flowing back to a refrigerator compartment return duct if the door is open and the compressor is being driven; and
driving the fan until the compressor starts to be driven so as to prevent the cold air generated in the cooling chamber from flowing back to the refrigerator compartment return duct if the door is open and the compressor is not being driven,
wherein the refrigerator comprises:
the refrigerator compartment;
a freezer compartment placed under the refrigerator compartment;
a refrigerator compartment supply duct disposed behind the refrigerator compartment and having a slope and the fan therein;
the refrigerator compartment return duct disposed in a lower part of the refrigerator compartment;
a freezer compartment louver disposed on a side of the freezer compartment and having a freezer compartment supply duct and a freezer compartment return duct provided therein; and
the cooling chamber comprising an evaporator therein,
wherein when the fan is driven, cold air generated in the cooling chamber flows into the refrigerator compartment supply duct wherein rising cold air rises up along the slope to flow into the refrigerator compartment and falling cold air descends down along the slope to flow into the freezer compartment through the freezer compartment supply duct, and the rising cold air and the falling cold air cool the refrigerator compartment and the freezer compartment and return to the cooling chamber through the refrigerator compartment return duct and the freezer compartment return duct, respectively.

2. The method of claim 1, wherein the fan is disposed below the refrigerator compartment.

3. The method of claim 1, further comprising determining if the temperature in the refrigerator is below a predetermined threshold, and if so, driving the fan regardless of a driving state of the compressor.

4. The method of claim 1, further comprising defrosting the evaporator.

5. The method of claim 4, further comprising stopping operation of the compressor and/or the fan or preventing the compressor and/or the fan from starting operation while defrosting the evaporator.

6. A non-transitory computer usable medium having computer-readable instructions embodied therein for implementing a method of controlling components of a refrigerator, the method comprising:
sensing whether a door of a refrigerator compartment is open;
determining whether a compressor of the refrigerator is being driven;
continuing driving a fan of the refrigerator so as to prevent cold air generated in a cooling chamber from flowing back to a refrigerator compartment return duct if the door is open and the compressor is being driven; and
driving the fan until the compressor is driven so as to prevent the cold air generated in the cooling chamber from flowing back to the refrigerator compartment return duct if the door is open and the compressor is not being driven,
wherein the refrigerator comprises:
the refrigerator compartment;
a freezer compartment disposed under the refrigerator compartment;
a refrigerator compartment supply duct disposed behind the refrigerator compartment and having a slope and the fan therein;
the refrigerator compartment return duct disposed in a lower part of the refrigerator compartment;
a freezer compartment louver disposed on a side of the freezer compartment and having a freezer compartment supply duct and a freezer compartment return duct provided therein; and
the cooling chamber comprising an evaporator therein;
wherein when the fan is driven, cold air generated in the cooling chamber flows into the refrigerator compartment supply duct, wherein a part of the cold air rises up along the slope to flow into the refrigerator compartment and the remaining cold air descends down along the slope to flow into the freezer compartment through the freezer compartment supply duct, and the rising part of the cold air and the remaining descending part of the cold air cool the refrigerator compartment and the freezer compartment and return to the cooling chamber through the refrigerator compartment return duct and the freezer compartment return duct, respectively.

7. The non-transitory computer usable medium of claim 6, wherein the fan is disposed below the refrigerator compartment.

8. The non-transitory computer usable medium of claim 6, wherein the method further comprises determining if the temperature in the refrigerator is below a predetermined threshold, and if so, driving the fan regardless of a driving state of the compressor.

9. The non-transitory computer usable medium of claim 6, wherein the method further comprises defrosting the evaporator.

10. The non-transitory computer usable medium of claim 9, wherein the method further comprises stopping operation of the compressor and/or the fan or preventing the compressor and/or the fan from starting operation while defrosting the evaporator.

* * * * *